June 14, 1927.
C. L. MOON
1,632,558
ROTARY CROSSOVER SWITCH
Filed June 21, 1926
2 Sheets-Sheet 2
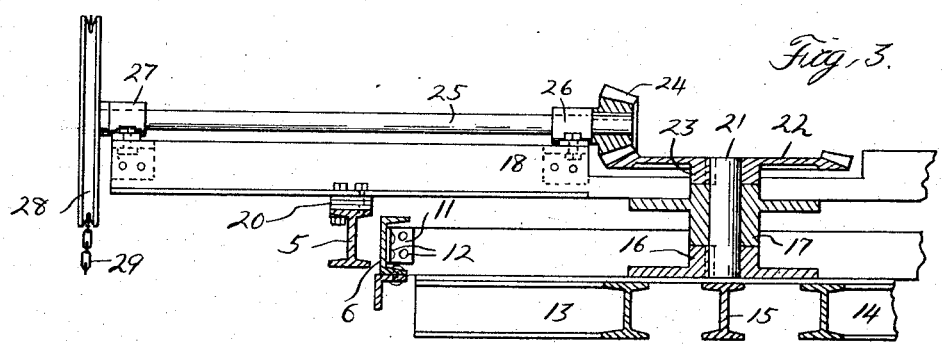
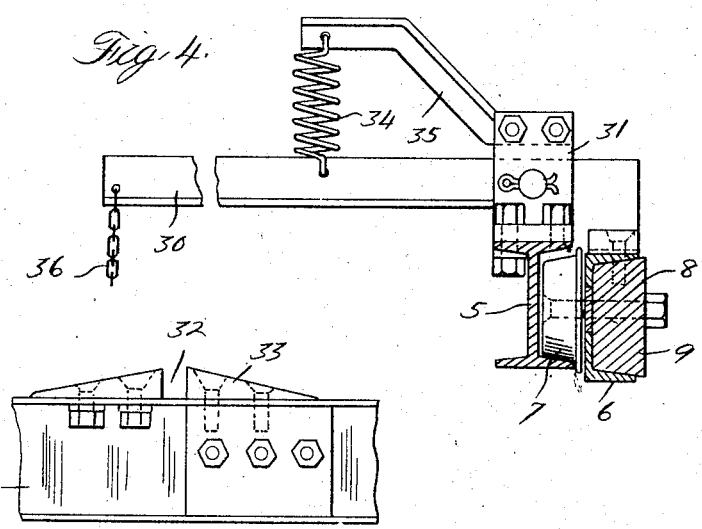
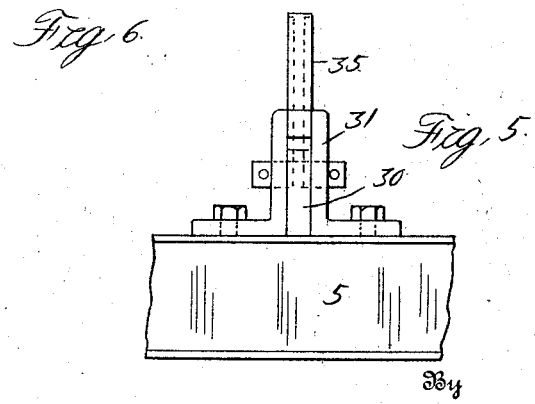
Inventor
Charles L. Moon
By
Attorneys Patented June 14, 1927.

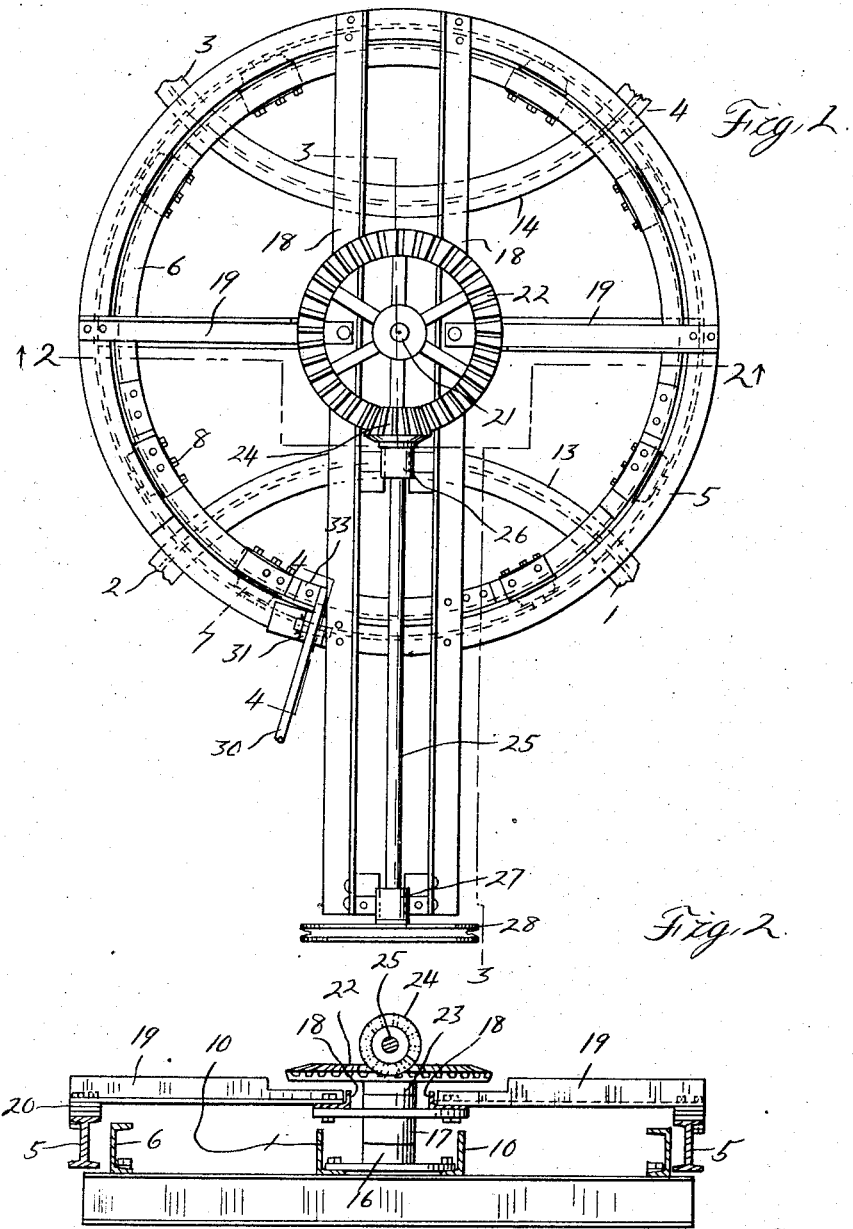

1,632,558

UNITED STATES PATENT OFFICE.

CHARLES L. MOON, OF DETROIT, MICHIGAN, ASSIGNOR TO THE CECIL R. LAMBERT COMPANY, OF DETROIT, MICHIGAN, A CORPORATION OF MICHIGAN.

ROTARY CROSSOVER SWITCH.

Application filed June 21, 1926. Serial No. 117,646.

The invention relates to trolley switches and refers particularly to rotary crossover switches for use in overhead trolley systems. One of the objects of the invention is to provide a rotary switch including a switch rotatable to a number of different positions to connect the ends of different pairs of stationary track sections. Another object is to provide a device operable from a remote point for rotatably adjusting the switch.

With these as well as other objects in view, the invention resides in the novel features of construction and combinations and arrangements of parts as more fully hereinafter set forth.

In the drawings:—

Figure 1 is a plan view of an overhead trolley system having as a part thereof a switch embodying my invention;

Figures 2, 3 and 4 are cross sections on the lines 2—2, 3—3 and 4—4, respectively, of Figure 1;

Figures 5 and 6 are side elevations of portions of the switch support and switch, respectively.

The switch herewith shown is designed particularly for use in an overhead trolley system where 1, 2, 3 and 4 are stationary track sections suspended from an overhead frame and adapted to support a trolley. The track sections 1 and 3 are in alignment and extend at right angles to the track sections 2 and 4, which are also in alignment. The switch for alternatively connecting the track sections is also supported upon the frame, from which is suspended these track sections.

In detail, 5 is an annular frame from which is suspended the ends of the stationary track sections 1, 2, 3 and 4. This frame is preferably an I-beam and rotatably supports the switch concentric therewith. 6 is the frame carriage in the nature of an annular frame located concentrically within the annular frame 5 and preferably formed of a channel bar with the legs of the channel extending inwardly. 7 are trolley wheels which are journaled upon the outer ends of the bolts 8 extending radially through the frame 6 and the blocks 9 located in the channel of this frame. These trolley wheels are adapted to run around within the frame 5 upon its lower flange. 10 are parallel angle bars extending across the switch frame 6 and having their lower flanges substantially flush with the lower flanges of this frame and their ends rigidly secured to the frame as by means of the angle brackets 11 and the rivets 12. The track sections of the switch for connecting the ends of the stationary track sections 1, 2, 3 and 4 are arranged so that by rotatably adjusting the switch any two of the stationary track sections may be connected. As shown, I have provided the arcuate track sections 13 and 14 and the straight track section 15, which are secured to and suspended from the lower flanges of the frame 6 and angle bars 10. The straight section extends diametrically across the frame and the arcuate sections are symmetrically located on opposite sides of this straight section with their ends so located that they may alternatively register with the ends of any pair of stationary track sections extending at right angles. The ends of the straight track sections are adapted to register with the ends of the aligned stationary track sections. Thus, with this arrangement, it is possible by rotatably adjusting the switch to connect the ends of the stationary track sections in a number of different ways or combinations.

For locating the switch frame 6 concentrically within the frame 5, I have provided the hub 16 which is secured to the angle bars 10 axially of the frame 6. I have also provided the hub 17 in axial alignment with the hub 16 and thereabove, this hub being rigidly secured to the inner ends of the pair of angle bars 18 which are parallel and extend across and are rigidly secured to the upper flanges of the annular frame 5. 19 are reinforcing angle bars extending transversely of the angle bars 18 and connected at their inner ends to these angle bars and at their outer ends to the upper flanges of the frame 5, suitable spacers 20 being preferably provided between the frame and angle bars. For rotating the switch relative to its support, I have provided the shaft 21 which is journaled in the hub 17 and has its lower and upper ends respectively keyed to the hub 16 and the bevel gear 22, which latter has the hub 23 resting upon the hub 17. 24 is a bevel pinion meshing with the bevel gear and preferably keyed upon the shaft 25 which extends parallel to the angle bars 18 and thereabove and is journaled in the saddles 26 and 27 extending between and secured to these angle bars. The angle bars preferably extend at one end a substantial distance beyond the annular frame 5 so that they may support the shaft 25 at a substantial distance beyond this annular frame. The outer end of the shaft has secured thereto a suitable sheave or wheel 28 around which extends a chain 29 for rotating the shaft, this chain depending to a position where it may be readily operated by a man upon the floor.

For locking the switch in its various positions of rotative adjustment, I have pivotally mounted the lever 30 near its inner end upon the brackets 31, which are rigidly secured to the annular frame 5 preferably near one of the angle bars 18. This lever 30 extends radially of the annular frame and has its inner end adapted to alternatively engage in the recesses 32 formed between the blocks 33 rigidly secured upon the switch frame 6. 34 is a coil spring connected at its lower end to the lever 30 and at its upper end to the bracket 35 for yieldably holding the lever 30 to engage in one of the recesses 32. The bracket 35 is also mounted upon the annular frame 5 and preferably rigidly secured between the brackets 31. To the outer end of the lever 30 I secure the flexible member 36 which, as shown in the present instance, is a chain depending to a position where it may be readily operated by a man upon the floor.

In operation and assuming the parts to be in the position shown in Figure 1, if it is desired to rotate the switch to connect the ends of the stationary track sections 2 and 4 together, the man upon the floor first pulls downwardly upon the chain 36 to release the lever 30 from its notch 32, after which he pulls down upon the proper side of the chain 29 to rotate the shaft 25 which in turn through the bevel pinion 24, bevel gear 22 and shaft 21 rotates the switch frame 6 in the desired direction. As soon as the switch frame has been rotated sufficiently to bring the recess 32 out of alignment with the inner end of the lever 30, the chain 36 may be released and rotation of the shaft and consequently the switch frame continued until the inner end of the lever engages in the next recess.

From the above description, it will be readily seen that I have provided a rotary switch for use in overhead trolley systems which may be adjusted to connect a number of stationary track sections in a number of ways. It will also be seen that I have provided a simple arrangement for mounting the switch for rotation and that I have provided means for rotating the switch and also locking the switch in its various positions of rotative adjustment which are operable from a remote position.

What I claim as my invention is:

1. The combination with stationary track sections arranged at right angles to each other and an annular frame, of an annular carriage located within said frame, trolley wheels upon said carriage traveling upon said frame for supporting the former from the latter and track sections upon said carriage having their ends alternatively registerable with the ends of different pairs of said stationary track sections.

2. The combination with stationary track sections and an annular I-beam, of an annular flanged bar within said I-beam, members secured to said bar and resting upon the lower flange of said I-beam and arcuate and straight track sections carried by said bar and having their ends registerable with the ends of different pairs of said stationary track sections.

3. The combination with stationary track sections and an annular I-beam, of an annular channel-shaped carriage located concentrically within said annular frame, trolley wheels secured to the base of said channel-shaped carriage and traveling upon the lower flange of said I-beam and arcuate and straight track sections carried by said carriage having their ends registerable with the ends of different pairs of said stationary track sections.

4. The combination with stationary track sections and an annular frame having spaced substantially parallel flanges, of a carriage located within said annular frame, means for rotatably mounting said carriage upon said frame including members secured to said carriage and engageable between the flanges aforesaid, a track section carried by said carriage and having its ends registerable with the ends of said stationary track sections, and means for rotating said carriage including a rotatable shaft and a flexible connection carried by and depending from said shaft for rotating the latter.

5. The combination with a plurality of stationary track sections and an annular frame, of a channel-shaped carriage rotatably mounted within said frame, angle bars extending across the carriage having their lower flanges substantially flush with the lower flanges of said carriage, means for concentrically supporting said carriage within said frame including a hub rigidly secured to said angle bars and a second hub carried by said frame in axial alignment with the hub aforesaid, a track section comprising straight and curved tracks carried by said carriage having the ends thereof registerable with the ends of said stationary track sections, and means for rotating said carriage relative to said frame including a shaft journaled in the second mentioned hub and keyed to said first mentioned hub.

In testimony whereof I affix my signature.

CHAS. L. MOON.